Nov. 22, 1938.  R. B. OTWELL  2,137,855
COLLAPSIBLE PLANT CONTAINER
Filed Feb. 23, 1938

Ralph B. Otwell INVENTOR
BY
_____ ATTORNEY

Patented Nov. 22, 1938

2,137,855

UNITED STATES PATENT OFFICE 2,137,855

COLLAPSIBLE PLANT CONTAINER

Ralph B. Otwell, Pinckney, Mich.

Application February 23, 1938, Serial No. 191,927

3 Claims. (Cl. 47—37)

This invention relates to an improvement in a collapsible container adapted for planting, shipping, and the display of shrubs, trees or other plants and is an improvement over that shown in applicant's co-pending application for patent, Serial No. 168,985, in which openings are provided extending at right angles from the respective corners of the container, through which the roots of the plant bedded therein may pass into the ground in which it may later be planted.

An object of the present invention is to provide a plant container wherein the walls of the container have offset panel portions integral with the walls bounding the panels and which remain intact therewith to support its soil content and the plant bedded therein until transferred to a permanent location in open ground. The panels are then severed from the wall of the container by slicing through the offset ledge connecting the panel in spaced relation to the parallel walls bounding said panels. The panels being thus removed, the earth is exposed in the container—without disturbing the latter, or causing injury to the roots of the plant bedded therein—and the soil may thus readily intermingle with the soil in which the plant is bedded. The plant is thus not subjected to a "set back", resulting in a change from its former habitat or station.

A further object of the invention is that by maintaining the walls of the plant container intact, without "openings" therethrough, until it is about to be bedded in "open" ground the plant will always be in condition for display and growth. Furthermore the walls of the container are not weakened due to "openings" and therefore keep their shape regardless of the moisture of the soil within the container, or other like causes. A further advantage is that the roots of the plant cannot extend through the wall of the container to interlock with the roots of adjacent plants, nor are there any "openings" through which the soil may spill or protrude.

With the foregoing and other objects in view, which will appear as this description proceeds, the invention further resides in the details of construction hereinafter described and claimed, it being understood that changes may be made in the precise embodiment of the invention herein disclosed without departing from the spirit of the same.

In the drawing accompanying this specification:—

Figure 1:
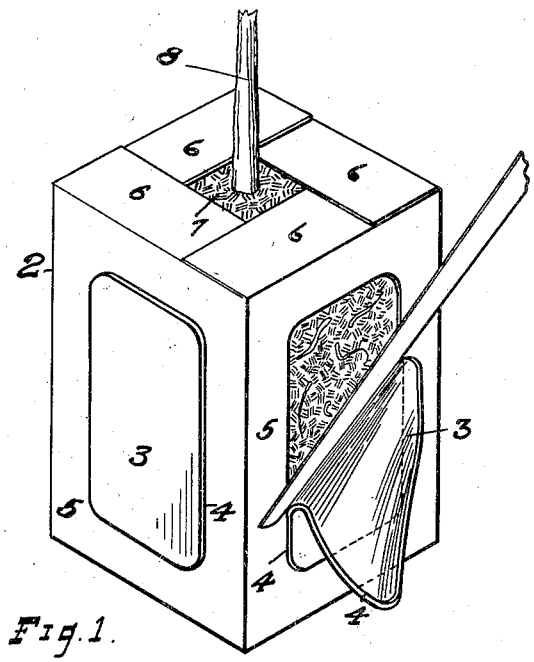
Figure 1 is a perspective view of the container, showing a knife in the act of slicing away one of its panels.
Figure 2:
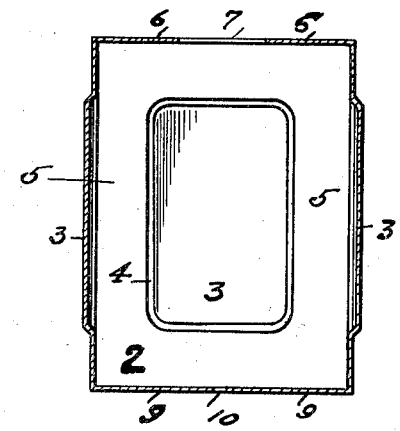
Figure 2 is a vertical cross-sectional view through the container.
Figure 3:
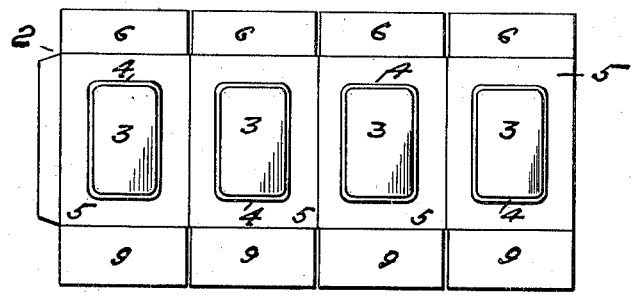
Figure 3 is a view of the "blank" before making up as a container.
Figure 4:
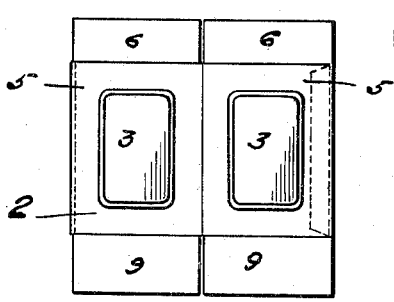
Figure 4 is an elevation of the container as it would appear when collapsed.
Figure 5:
Figure 5 is an end view of the container, collapsed for shipment or storage, and as it appears before being "set-up" to receive the soil and plant.

Referring now to the reference characters upon the drawing to indicate the several parts:—

Numeral 2, denotes the collapsible container as it would appear when housing a young tree or plant, showing one of the panels about to be removed,—preparatory to planting the young tree in open ground, and while lodged in the container.

The numeral 3, indicates the panels raised by an offset rim 4, from the walls 5, bounding the panels.

Flaps 6, integral with the walls 5, are adapted to fold over the top of the soil lodged in the container, leaving a central opening 7, through which the stem 8, of the plant or tree may grow and be watered. Like flaps 9, integral with the lower edges of the container form a "floor" to support the soil and plant housed therein, leaving a central drainage hole 10, through which moisture may escape.

The container is filled with soil, fertilizer and other suitable plant food in which the young tree or plant is bedded and in which it remains until planted in the open ground.

The container is constructed of a suitable waterproof paper or fabric and the walls remain imperforate until the plants are to be bedded in their final location in "open ground".

The imperforate walls insure the container being maintained in proper shape and form, while the roots and soil are retained within its walls, thus providing a pleasing display unit for either nursery or greenhouse, and equally satisfactory for shipping to the buyer regardless of the length of haulage.

Upon reaching its destination and before planting, the panels 3, are sliced away from the walls of the container, as indicated in Figure 1 of the drawing, thereby exposing the soil and roots, without disturbing the soil or causig injury to the roots of the tree or plant.

The container with its tree or plant may thus be bedded in the soil designed for its future habitat, in which the roots of the tree will rapidly grow and the soils intermingle.

What I claim is:—

1. In a planting unit for gardens; a tubular container, having walls formed with a plurality of panels extending outwardly, and from the plane of the walls bounding said panels; and an outstanding rim portion integral with both the walls and panels, adapted to provide a construction whereby said panels may be readily sliced from the walls bounding said panel to permit the growth of plant roots into outer soil, without disturbing the soil housed in the unit, or injuring the roots of a tree or other plant bedded therein.

2. In a device of the character described, the combination of a tubular container, rectangular in cross-section and constructed of pliable material, having walls formed with panels projecting outwardly and from the plane of the walls bounding said panels; a relatively narrow rim integral with both the walls and panels, forming a ledge adapted to facilitate the removal of said panels when pierced by a knife blade held parallel to the wall and panel, whereby the panel may be removed from the wall of the unit without disturbing the soil in which a plant may be bedded in said unit, or injuring the roots of said plant bedded therein, and whereby said roots may grow beyond the confines of the walls of the container into the soil in which they may be subsequently bedded.

3. In a planting unit for gardens; a tubular container having an opening at its upper end through which the stem of a plant may extend, and a drainage hole at its lower end for the discharge of water, said plant container having walls formed with a plurality of panels extending outwardly and raised above the plane of the walls bounding said panels, whereby an outstanding ledge is provided integral with the panels and the walls bounding the latter, to facilitate the removal of the panels by slicing through said ledge, without disturbing the soil housed in the unit or injury to the roots of a tree or plant bedded therein, and whereby the plant roots may be free to enter the outer soil in which the container may later be bedded.

RALPH B. OTWELL.